Oct. 30, 1928.
R. M. RODDICK
1,689,561
DISPENSING APPARATUS
Original Filed April 15, 1927   2 Sheets-Sheet 1
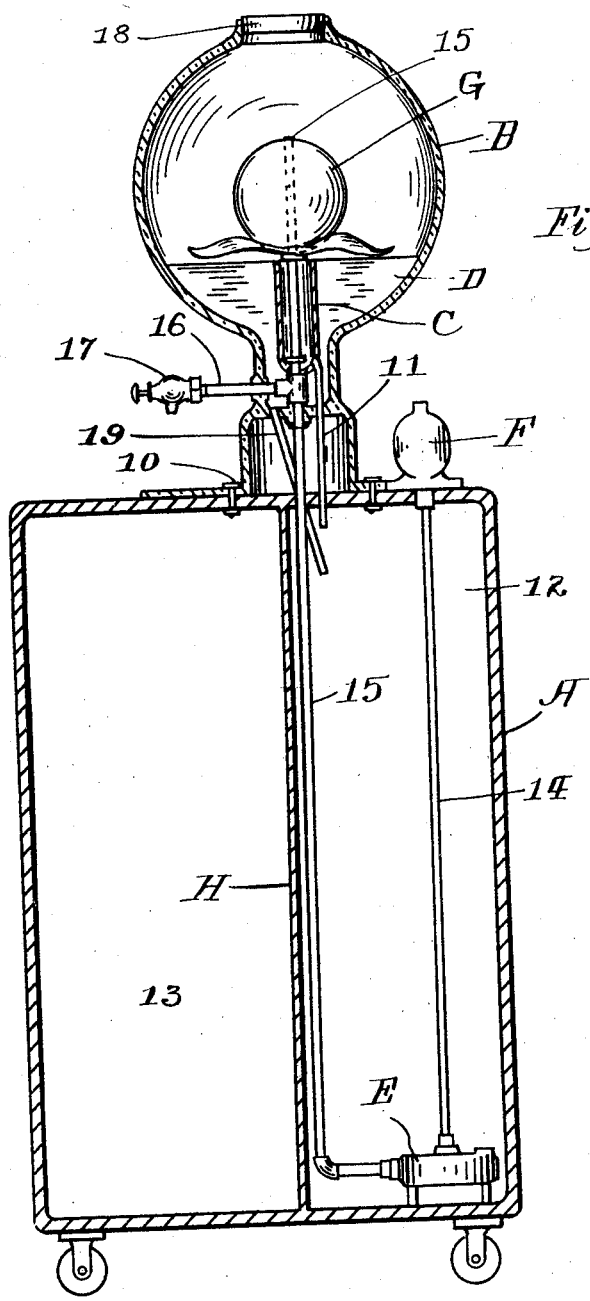
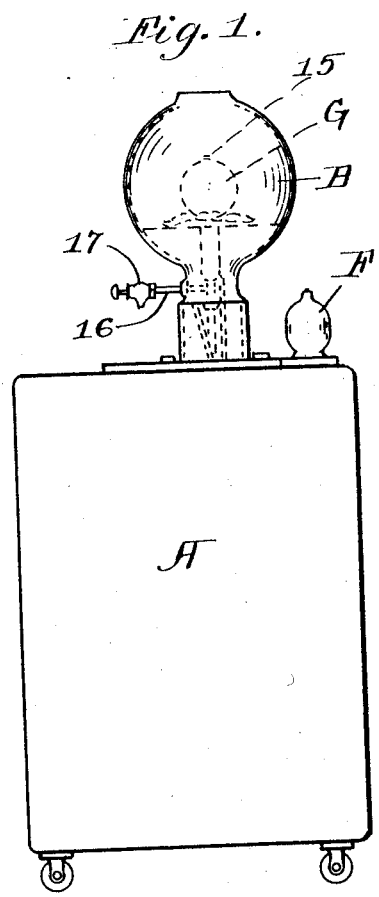
Inventor:
Russell M. Roddick
by: Bradbury & Caswell
Attorneys.

Oct. 30, 1928.
R. M. RODDICK
1,689,561
DISPENSING APPARATUS
Original Filed April 15, 1927　　2 Sheets-Sheet 2
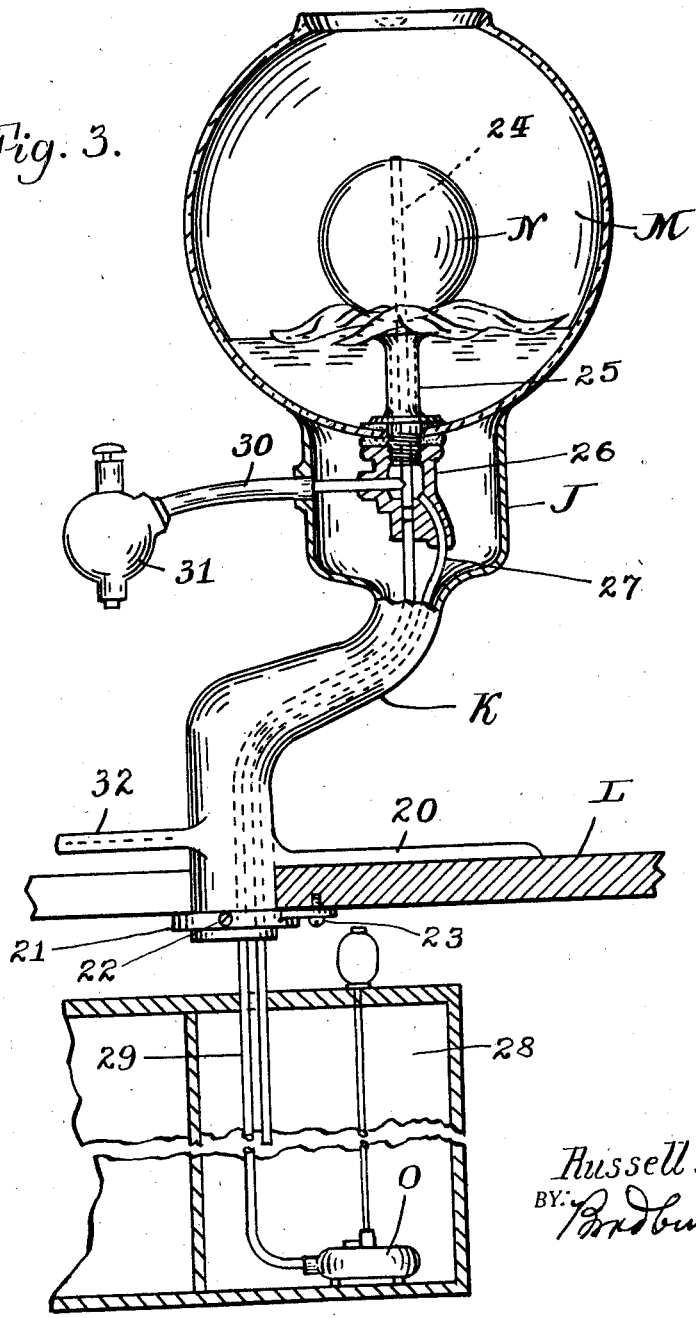
INVENTOR.
Russell M. Roddick,
BY Bradbury & Caswell
ATTORNEYS.

Patented Oct. 30, 1928.

1,689,561

UNITED STATES PATENT OFFICE.

RUSSELL M. RODDICK, OF PASADENA, CALIFORNIA.

DISPENSING APPARATUS.

Application filed April 15, 1927, Serial No. 183,997. Renewed March 23, 1928.

An object of this invention is to provide dispensing apparatus in which an image of an object such as an orange, apple or other fruit is used for display purposes and in which a bubbling stream, imitating the juice of said fruit is automatically forced up, through and precipitated over the object to simulate the production of the juice dispensed by the apparatus.

Dispensing apparatus of this character used in a store, booth or stand will attract attention for advertising purposes and will make it appear that the drinks are produced by fresh juice from the kind of fruit displayed by the object.

To these ends my invention relates to the improvements and features of construction set forth in the following specification.

In the accompanying drawings forming part of this specification, Fig. 1 is a side elevation of my invention; Fig. 2 is a central section on a slightly larger scale than the view appearing in Fig. 1, and Fig. 3 is a central vertical section of an alternative construction.

In the drawing A indicates a cooler or cabinet which is intended for holding ice and fruit juice to be dispensed as drinks in glasses or cups in stores, booths or stands. Above this cabinet is arranged a transparent receptacle B, made out of glass or other suitable material and of partly globular shape, said receptacle being fastened on the cabinet by bolts 10 or other suitable means. The lower portion of the transparent receptacle is provided with an overflow cup C, projecting upwardly thereinto and the upper edge of which determines the height at which fruit juice or other liquid D may be maintained in the receptacle. A basin is thus formed in the receptacle for the purposes to be hereinafter described.

The cabinet is divided by the wall H or other suitable means, into the fruit juice reservoir 12 and the ice compartment 13 for cooling the juice in the reservoir. The overflow cup C has a duct leading into the reservoir for conducting the overflow. A pump E in the reservoir and driven by the electric motor F and connecting drive shaft 14 is adapted to force fruit juice up through the pipe 15 into the transparent receptacle B. The upper end of pipe 15 penetrates and supports the image G immediately above and spaced from the overflow cup C. Said image may represent an orange, apple or other fruit which corresponds with the kind of juice which is being dispensed from the reservoir. The liquid thus projected is made to bubble in a stream over said image and flow down into said basin. The image may be made out of vitrified clay, china or other moisture resisting material and decorated by coloring and shaping to simulate the fruit from which the juice in the reservoir has been extracted. In this manner a continuous stream of juice is adapted to be circulated from the reservoir, up and over the image and into said basin and from the basin back into the reservoir 13. The bubbling of the juice over the fruit image and the pool of juice collected in the basin presents a pleasing and attractive appearance to the observer and draws to his or her attention the fact that the juice being dispensed has been freshly extracted from the fruit simulated by the image G in the receptacle. The receptacle is preferably closed to protect the juice from contamination but may be cleaned by removing the stopper or cover 18.

A branch 16 of the tube 15, leading outwardly from the receptacle and provided with the automatically closing faucet 17 is provided for dispensing drinks from the apparatus. A small drain or bleeder duct 19 in the bottom of the receptacle and entering the reservoir is provided for preventing sediment from collecting in the receptacle. The fact that the faucet connection with the circulating pipe 15 is in full view of the observer through the transparent walls of the apparatus enables the observer to see that the same juice is being dispensed for drinks that bubbles over the image in the receptacle.

In operation the pump is operated continuously and the juice circulated from the reservoir and caused to bubble over the image in the receptacle and return from the basin in the receptacle. When the faucet is opened, juice is drawn from the circulating duct and the bubble fountain temporarily ceases to function thus showing that the same juice is being dispensed that bubbles over the image.

Various changes in construction for performing the functions set forth are contemplated within the scope of the following claims.

One form of change is illustrated in Fig. 3, in which the display fountain of the apparatus is constructed as a separate element detachably applicable to counters or other supports and adapted to be connected with a source of cold juice supply under pressure, located below or near the counter. In this structure the fixture has a hollow head J and a curved neck K which is inserted through the counter support L and fastened by the bearing flange 20 and collar 21, the latter being secured by the screws 22 and 23. The transparent bowl M is supported in the head and contains the display object N which is supported upon the fountain stem 24 as described in the preferred form. The overflow cup 25 mounted upon the stem is secured through the bowl by the hollow fitting or nut 26, from which the return overflow duct 27, extends downwardly through the neck K and leads to the fruit juice reservoir or sump 28. The motor driven pump O in the reservoir is connected by the tube 29, extending upwardly through the neck K and fitting 26, with the bubble fountain stem 24 and has a branch 30 carrying the faucet 31 for dispensing the juice. A supporting wing 32 on the neck is adapted to hold a receptacle to be filled with juice. The operation of the apparatus is substantially the same as the operation of the preferred form of structure above described. This form of the invention is more readily applicable to counters already installed.

Having described my invention, what I claim as new and desire to secure by Letters Patent is:

1. Apparatus of the class set forth, comprising, in combination, an image representing fruit from which the juice to be dispensed is extracted, a basin below said image, a duct terminating above said image and through which juice is adapted to bubble and flow over said image and drop into said basin, and means for circulating the juice caught by said basin upwardly through said duct.

2. Apparatus of the class set forth, comprising, in combination, a cabinet having a holding reservoir, a transparent receptacle mounted near said cabinet having a cup therein connected with said reservoir and adapted to maintain a pool of said fruit juice in said receptacle, a duct leading from said reservoir upwardly through and terminating above said cup, an image of fruit from which said juice has been extracted mounted upon the upper end of said duct above the pool of juice in said receptacle and over the surface of which juice from the reservoir bubbles, flows and drops into said pool, means for projecting said juice from the reservoir upwardly through said duct, a faucet connected with said duct for dispensing juice from said duct and a bleeder opening from the receptacle into said reservoir, for the purposes specified.

In witness whereof, I have signed my name to this specification.

RUSSELL M. RODDICK.